United States Patent [19]

Landis

[11] 4,341,640
[45] Jul. 27, 1982

[54] UREA HYDROLYSIS

[75] Inventor: Norris J. Landis, Cleveland Heights, Ohio

[73] Assignee: Standard Oil Company, Ohio

[21] Appl. No.: 90,202

[22] Filed: Nov. 1, 1979

Related U.S. Application Data

[63] Continuation of Ser. No. 726,893, Sep. 27, 1976, abandoned.

[51] Int. Cl.³ .......................... B01D 3/26; C02F 1/02
[52] U.S. Cl. ...................................... 210/752; 55/38; 55/70; 210/774; 261/114 R; 564/73
[58] Field of Search ..................... 210/59, 61, 71, 752, 210/774; 260/555 R, 555 A; 261/114 R, 114 JP, 114 A, 114 VT; 564/73

[56] References Cited

U.S. PATENT DOCUMENTS

| 516,154 | 3/1894 | Ellis | 261/114 R |
| 852,487 | 5/1907 | Zschech | 261/114 R |
| 1,488,422 | 3/1924 | Whitelaw | 261/114 R |
| 3,668,250 | 6/1972 | Karafian | 260/555 A |
| 3,725,210 | 4/1973 | Otsuka et al. | 260/555 A X |
| 3,729,179 | 4/1973 | Keller | 261/114 VT X |
| 3,922,147 | 11/1975 | Sze et al. | 261/114 R X |
| 3,922,222 | 11/1975 | Van Moorsel | 210/71 |
| 4,089,752 | 5/1978 | Hancock | 261/114 R X |

FOREIGN PATENT DOCUMENTS

| 828327 | 10/1975 | Belgium | 261/114 R |

OTHER PUBLICATIONS

E.P.A. Development Document, 440/1-73/011, Nov. 1973, pp. 81 and 103-105.
Powell, *Urea Process Technology*, 1968, pp. 123-128, 190-195.

Primary Examiner—Robert H. Spitzer
Attorney, Agent, or Firm—David J. Untener; Herbert D. Knudsen; Larry W. Evans

[57] ABSTRACT

The process for the purification of urea containing waste streams is improved by conducting the purification in a vessel having at least one treating zone wherein the urea containing waste stream is both hydrolyzed and stripped of the products of the urea hydrolysis and other impurities found in the waste stream.

8 Claims, 5 Drawing Figures

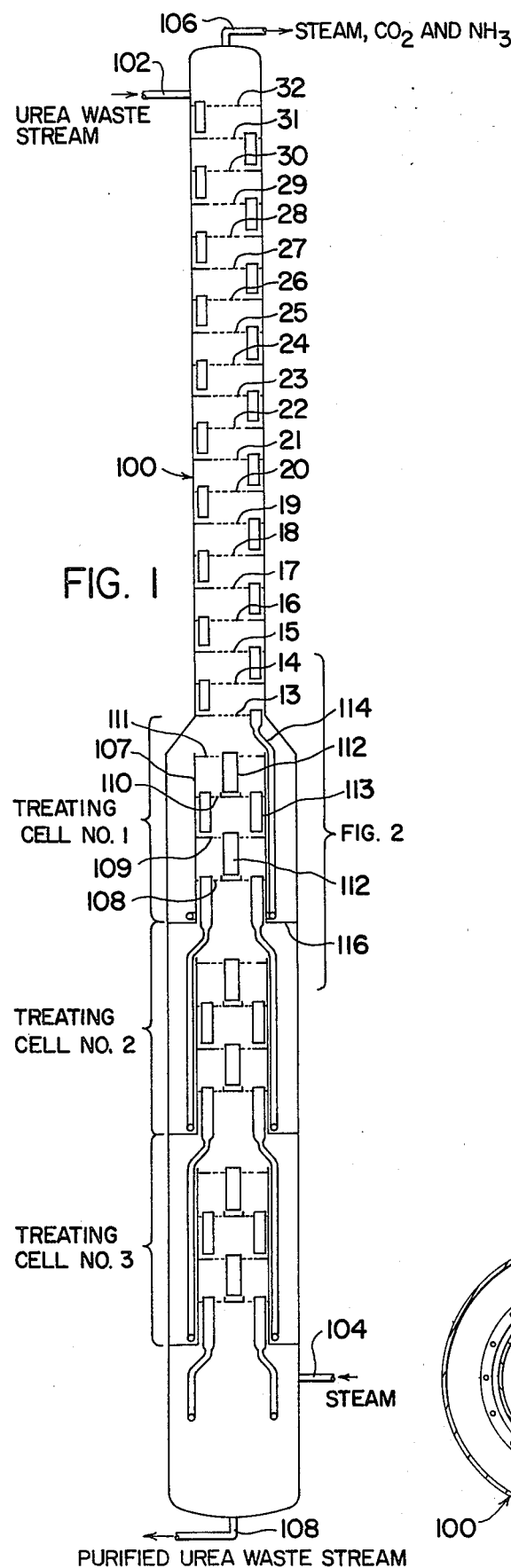
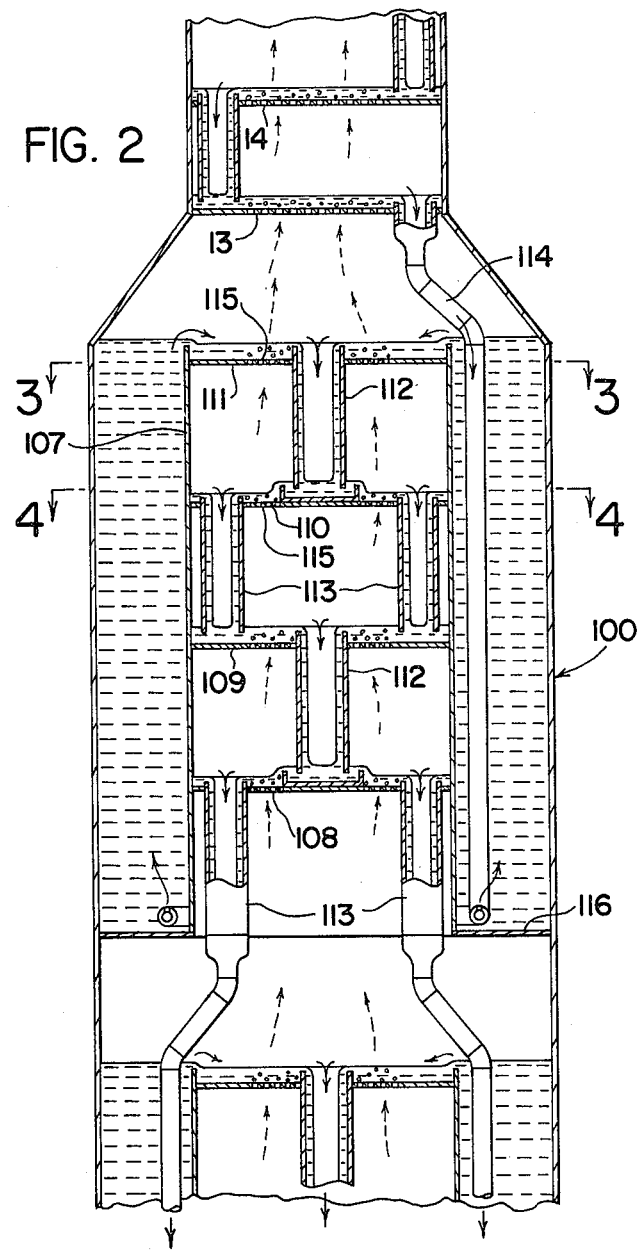
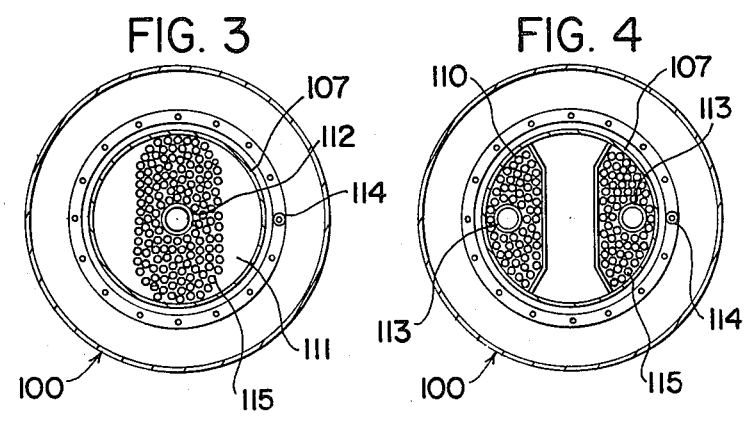

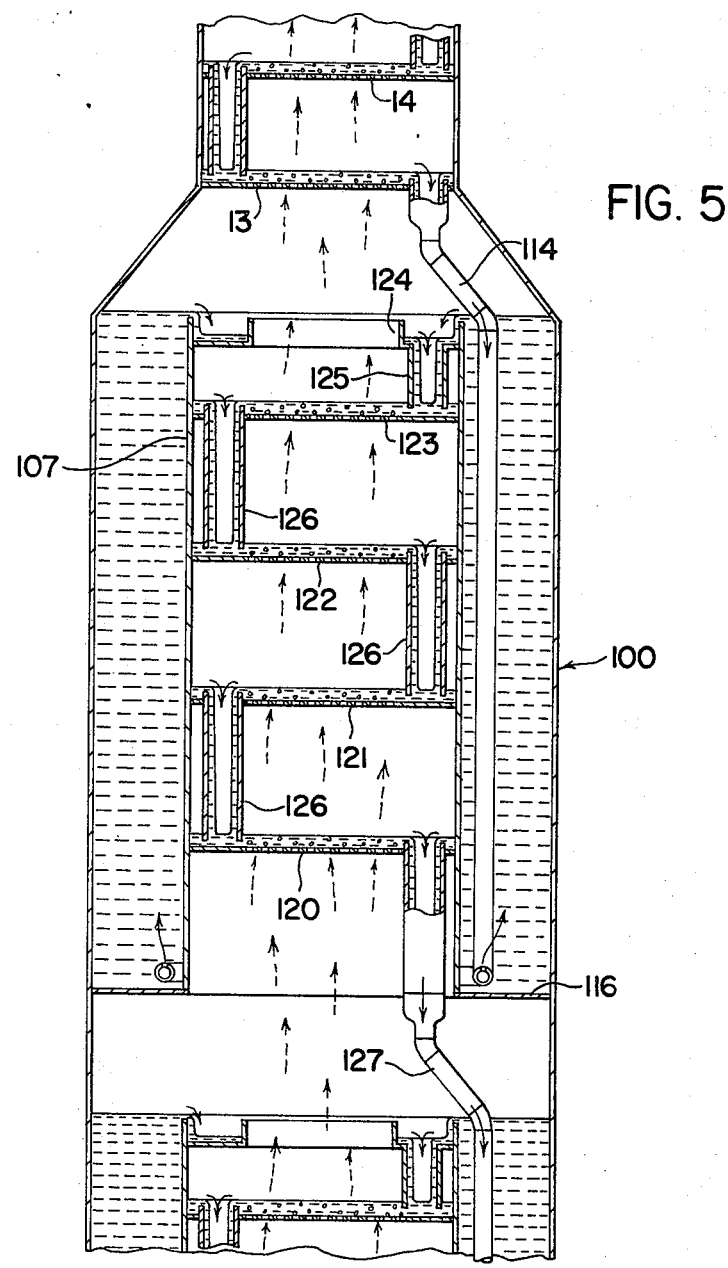

UREA HYDROLYSIS

CROSS RELATED APPLICATIONS

This application is a continuation of Ser. No. 726,893, filed Sept. 27, 1976, now abandoned.

BACKGROUND OF THE INVENTION

Various systems for the hydrolysis of urea are known in the art. Technology currently employed in the U.S. is summarized by the EPA report Number 440/1-73/011, Development Document for Proposed Effluent Limitations Guidelines and New Source Performance Standards for the Basic Fertilizer Chemicals Segment of the Fertilizer Manufacturing Point Source Category. The urea hydrolysis systems practiced normally entail the use of a plurality of trays in a column. The urea waste stream is fed to the top of the column and a counter-current stream of steam is fed from the bottom. Although any free ammonia found in this stream is removed, a substantial amount of the urea passes through the column and into the effluent stream. Urea is considered deleterious in natural waterways in that it promotes algae growth and hydrolyzes slowly, releasing ammonia which is toxic to fish.

This invention provides for the destruction of the urea by hydrolyzing, forming volatile ammonia and carbon dioxide. These products are then removed by stripping performed in the hydrolysis column.

My co-pending application Ser. No. 609,475 filed Sept. 22, 1976 now abandoned, discloses the use of liquid holding zones within a vessel to improve the urea hydrolysis. The present invention improves on this concept by combining the stripping and hydrolysis functions into one or more treating cells. This improvement greatly reduces the size and cost of the vessel needed for this process, particularly where requirements are for a high degree of urea removal efficiency.

SUMMARY OF THE INVENTION

The invention is in the process for the purification of an aqueous urea waste stream in a vessel comprising hydrolyzing the urea to reduce the concentration of the urea in the waste stream and stripping the products of the urea hydrolysis and other gases from the waste stream with steam, the improvement comprising conducting the hydrolysis in at least one treating cell, comprising an inner cylinder located within the vessel, having inside and outside surfaces, having one or more stripping trays connected to the inside surface, and a liquid holding zone located between the outer surface of the cylinder and the vessel that is maintained substantially separate from the vapor streams.

The central feature of the present invention is the creation of a treating cell having both stripping and hydrolysis functions. This has the advantage of providing liquid holding zones within the vessel or column without greatly increasing the height and cost of the column. In addition, the present invention provides less restriction to the vapor flow proceeding up the column through the stripping tray.

The treating cell consists of a stripping section and a liquid holding zone. The liquid holding zone is located between the stripping section and the vessel wall. Liquid from the stripping tray above the treating cell is carried by a conduit to the bottom of the liquid holding zone. Thus, separation of the vapor from the liquid is maintained in this holding zone.

The liquid holding zone of the present invention must contain enough volume of the liquid phase to allow enough retention time to advantageously increase the hydrolysis of the urea in the column. The volume of liquid contained in this zone is dependent on many factors. The more treating cells that are used, the less volume of liquid each holding zone must contain. Also, an increase in pressure of the column increases the hydrolysis rate, whereby less volume is required. A higher feed rate will require more volume of liquid for the same retention time. The liquid holding zones should contain at least 5% and preferably 15 to 20% by volume of the entire liquid in the vessel. Retention times of 2 to 10 minutes per zone for a four-cell column as shown in the drawing are typically adequate to obtain acceptable urea hydrolysis. This retention time must obviously increase or decrease as the number of treating cells or operating conditions change.

The stripping section is located within the treating cell. This stripping section consists of an inner cylinder having one or more stripping trays. The other surface of the cylinder, together with the vessel wall, forms the liquid holding zone. Thus both functions are combined in a compact easy-to-fabricate manner.

The stripping trays within this section may be those known in the art, including bubble-cap, valve-type, and sieve trays.

The number of trays within each cell may be the same or vary from cell to cell, but each cell must have at least one stripping tray.

These stripping trays have downpipes or downcomers that pass the liquid, after vapor contacting, to the next stripping tray. In one embodiment of the invention, the liquid from the annular holding zone overflows the full circumference of the topedge of the cylinder and flows radially inward across the stripping tray. The liquid is then collected in a center downpipe and passed to the next tray. On the succeeding tray, the liquid may flow radially outward or outward in opposite directions across the tray to peripherally located downpipes.

In a second embodiment of the invention, the overflow from the annular holding zone is collected and sent to a short downpipe. The liquid then passes through this downpipe and across the stripping tray. The liquid is collected on the opposite side in a second downpipe which transfers the liquid to the next tray.

In similar embodiments, other known tray design methods for movement of the liquid across the stripping trays and to the next succeeding tray may also be used. The present invention contemplates the use of any of these known methods for vapor-liquid contact within the cell.

As noted in the description of the invention, the hydrolysis vessel contains at least one treating cell. While there is no theoretical upper limit on the number of such cells, normal commercial practice would dictate that 2 to 8 treating cells, be employed. In addition to these treating cells, the hydrolysis vessel may also employ stripping trays above, in between, or below the treating cells. These stripping trays may be the same as or a different from those used in the treating cell. The use of these trays improves the ability to remove the products of the urea hydrolysis and other impurities from the waste stream.

In addition to the liquid holding zones found in the treating zones, the bottommost section of the hydrolysis column may also be used to provide retention time for the liquid. The liquid from the last stripping tray in the last treating cell may be transferred through a conduit to the bottom of the column. The bottom effluent stream may then be removed as a sidestream or overflow from this bottommost section.

An external reboiler may be used rather than direct steam addition to provide heat to the column. The liquid sent to such a reboiler may be from the normal liquid accumulation in the bottom of the column. By using known liquid drawoff trays, the reboiler liquid may also be from the last stripping tray in the last treating cell.

The operation of the hydrolysis column in the present invention is not substantially different from the operations of the stripping column in the art. Broadly, within the limits dictated by the art, the preferred temperature of the column is maintained at 120° to 250° C., and the outlet pressure at the top of the column is maintained at 30 to 300 p.s.i.g. The other operating variables of the process are well known in the art. The urea waste streams treated by the invention may vary widely. The waste stream should be free of inorganic impurities that would tend to reduce the efficiency of the column, but other organic impurities such as ammonia could be, and normally are, present in the urea waste stream.

DESCRIPTION OF THE DRAWING

FIG. 1 shows a schematic view of the urea hydrolysis column of the present invention;

FIG. 2 is an enlarged area of FIG. 1, showing the design of one of the treating cells within the column;

FIGS. 3 and 4 are sections taken on line 3—3 and 4—4 of FIG. 2 respectively, showing two details of the preferred stripping tray within the treating cell.

FIG. 5 shows a varient of the treating cell using side to side cross flow trays.

Referring to FIG. 1, it is seen that the urea hydrolysis unit consists of a column 100 having a plurality of stripping trays 13–32 and three treating cells labeled as such. Each treating cell has stripping trays, the first treating cell having trays 108–111. The urea waste stream is fed into the column through conduit 102 on tray 32. This liquid urea waste stream flows down the column, across the trays and into the treating cells. Steam is fed to the column through line 104 and entrains the urea hydrolysis products of $CO_2$ and $NH_3$ in the vapor and causes these products to be removed overhead through line 106. This vapor stream can be condensed and fed back to the process for producing urea. The purified urea waste stream is removed from line 108 and can be discharged to the environment.

Referring to FIG. 2, a detailed design of one of the treating cells is seen in cross-section view. The treating cell consists of a stripping section having a cylinder 107 containing stripping trays 108–111. In the embodiment of this figure, these trays have inside downpipes 112 and outside downpipes 113. This creates a radial flow of liquid across the trays.

The outer wall of cylinder 107 along with the vessel wall 100 and floor 116 create a liquid holding zone. Conduit 114 transmits the liquid from the stripping tray above to the bottom of the liquid holding zone. The liquid then flows upward over and into the cylinder and stripping trays.

FIGS. 3 and 4 show the detail of the preferred stripping trays used in the treating cell. Tray 111 is a plate having a perforated area 115 and inside downpipe 112. Tray 110 receives the liquid from this downpipe 112, the liquid flowing across another perforated area 115 and into the outside downpipes 113.

FIG. 5 shows the use of cross flow trays in a treating cell. The stripping section has the cylinder 107 and contains stripping trays 120–123. The liquid flows over the cylinder 107 into an overflow collector 124. This collector, around the circumference of the cylinder, transfers the liquid to a single downpipe 125. The flow of the liquid is then across the stripping tray 123 to the opposite downpipe 126. This procedure is repeated till tray 120. Here the liquid is transferred to the next cell by conduit 127, similar to conduit 114.

The use of the present invention provides very efficient urea hydrolysis along with a reduction in both the height and the cost of the columns associated with the prior art.

I claim:

1. In the process for the purification of an aqueous urea waste stream in a vessel comprising hydrolyzing the urea to reduce the concentration of the urea in the waste stream and stripping the products of the urea hydrolysis and other gases from the waste stream with steam, the improvement comprising conducting the hydrolysis in at least one treating cell comprising an inner cylinder located within the vessel, having inside and outside surfaces, having one or more stripping trays connected to the inside surface, and a liquid holding zone wherein hydrolysis is performed, located between the outer surface of the cylinder and the vessel that is maintained substantially separate from the vapor streams.

2. The process of claim 1 wherein the liquid holding zone contains at least 5 percent by volume of the entire liquid in the vessel.

3. The process of claim 1 wherein there are 2–8 treating zones in the vessel.

4. The process of claim 1 wherein the vessel is a column.

5. The process of claim 4 wherein one or more additional stripping trays are located within the column above the treating zone.

6. The process of claim 5 wherein the treating cells contain a conduit for passage of the liquid from the stripping tray above the treating cell into the liquid holding zone.

7. The process of claim 4 wherein the stripping trays within the treating cell comprise one or more trays having a perforated area for passage of the vapors and an inside downpipe located in the center of the tray and one or more trays having a perforated area for passage of the vapors and having outside downpipes located on the outer surface of the tray, said downpipes being used for passage of liquid from one tray to the next tray.

8. The process of claim 4 wherein the temperature of the column is maintained at 120° to 250° C., and the outlet pressure at the top of the column is maintained at 30 to 300 p.s.i.g.

* * * * *